Dec. 7, 1954        L. C. WITKIN        2,696,607
CIRCUIT CONTROL AND INDICATOR
Filed July 16, 1952
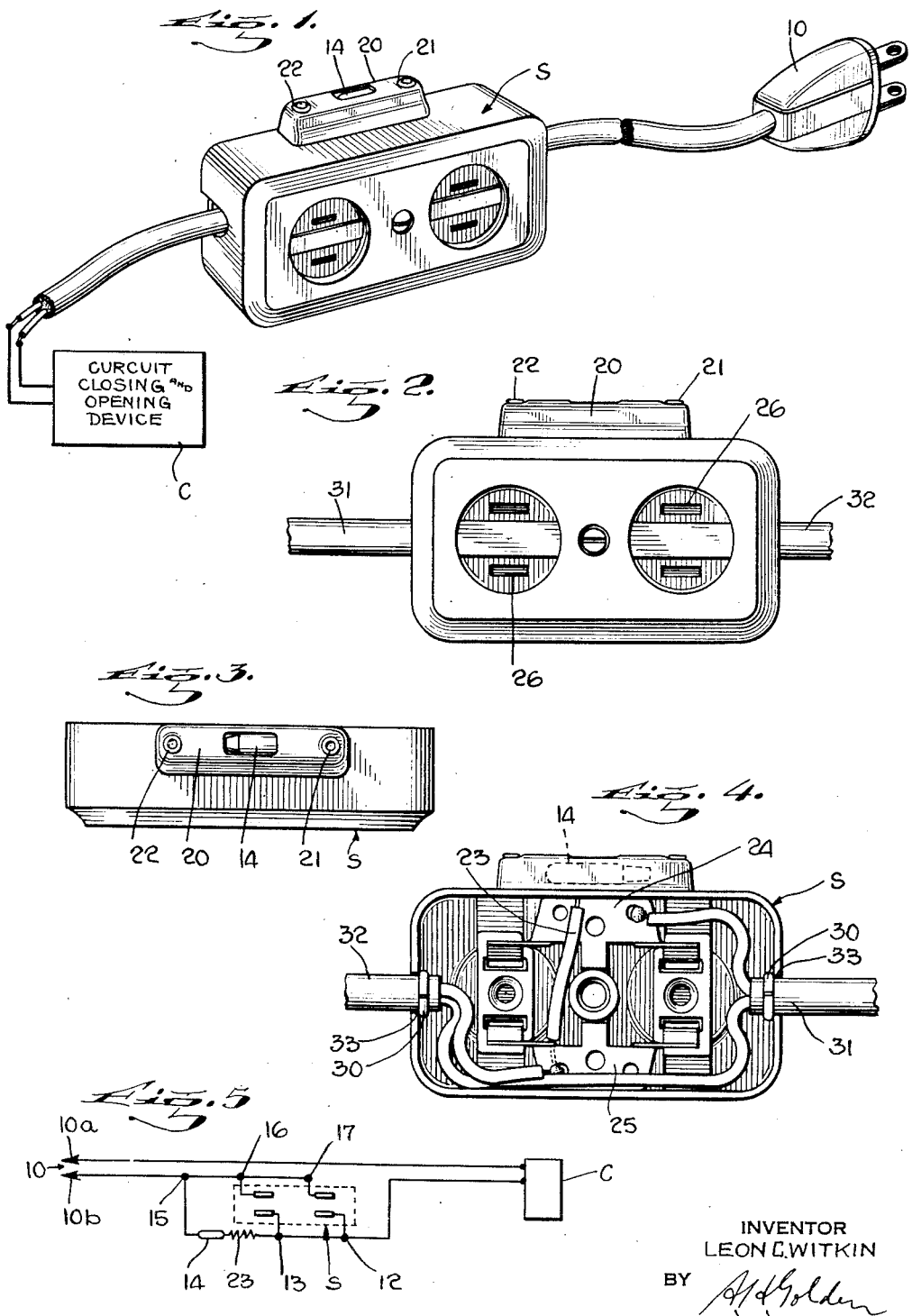
INVENTOR
LEON C. WITKIN
BY
ATTORNEY United States Patent Office 2,696,607
Patented Dec. 7, 1954

2,696,607

CIRCUIT CONTROL AND INDICATOR

Leon C. Witkin, Springdale, Conn.

Application July 16, 1952, Serial No. 299,065

8 Claims. (Cl. 340—252)

This invention relates to an article of commerce utilized for controlling the circuit closing and opening of various electric appliances and other devices, while indicating the condition of the circuit of the appliances. At the present time, there is available a mechanism utilizing a circuit closing and opening device in series with a socket and a plug. When the circuit closing and opening device is in circuit closing position, then electric current flows through the socket and is available for any appliance that may be plugged into the socket.

Actually devices of the particular class described are utilized for energizing heating devices for water pipes on farms, as one example, in which case the circuit closing and opening device takes the form of a thermostat. When the temperature drops the thermostat closes the circuit through the socket, and if a heating device is plugged into the socket, this heating device will naturally be energized to function as intended. It will be appreciated that the same arrangement may be used for many other applications.

In this combination of the prior art, it is desirable to have an indicator in order to make known to the user of the appliance whether or not the appliance is actually receiving the current and therefore is operating, and in the case of a water pipe heater, this is quite important as will be appreciated. For the particular purpose, the socket is formed with multiple contacts so that not only can the heater be plugged into the socket, but an indicating device in the form of an electric light bulb can similarly be plugged into the socket and indicate by its incandescence that a circuit is closed through the appliance by the circuit closing and opening device.

It is the purpose of my invention to contribute to the art an article of the class described that will make it possible to have at all times an indication of the condition of the circuit without requiring the plugging in of a special indicating electric bulb.

It is a further feature of my invention that therethrough I am able to indicate not only when the circuit is in closed position but also when the circuit is open, but is alive and available for operation.

As one feature of my invention, I utilize a circuit, the terminals of which are in series not only with a circuit closing and opening device, but also with the terminals of a plug. The contacts of the socket are, therefore, rendered alive or energized whenever the circuit closing and opening device is in circuit closing position. Applied in a suitable accessible manner to the socket, and in a position where it is readily seen, is a gas tube having one terminal thereof in electrical contact with the posive terminal of the socket whereby to indicate by its incandescence when the plug terminals are in a live circuit.

As a further feature of my invention, by placing the terminals of the gas tube across the contacts of the socket, I am able to indicate by a low incandescence that the plug terminals are in a live circuit, even when the circuit closing and opening device is in an open circuit position. Upon the closing of the circuit through the socket by the circuit closing and opening device, the gas tube will, of couse, be in series with the plug terminals and the circuit closing and opening device so as to indicate then by its high incandescence that the circuit closing and opening device is in circuit closing position.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings, Fig. 1 is a perspective view of the several parts of my new combination but with the circuit closing and opening device shown diagrammatically only.

Fig. 2 is an elevation of the socket of Fig. 1.
Fig. 3 is a view looking down on the socket of Fig. 2.
Fig. 4 is a rear view of the socket with the rear cover plate removed therefrom.
Fig. 5 is a diagrammatic view of the entire circuit of my invention.

Referring now more particularly to the drawings and especially to Fig. 1, reference numeral 10 indicates the usual type of electrical plug, while the socket of my invention is indicated generally by reference letter S. The circuit closing and opening device may be either a thermostat or a time controlled device and is designated generally by the reference letter C.

Referring now to the wiring diagram of Fig. 5, the circuit of my invention is as follows: From terminal 10a of plug 10 to the circuit closing and opening device C, the circuit then traverses device C and goes to point 12 where it is connected to one of the contacts of the socket, there being four of these contacts. At point 13 of the circuit there is connected another terminal of the socket S. The circuit then continues in series through a gas tube 14 and resistor 23 to point 15, and then to plug terminal 10b. This tube 14 is of the type rendered slightly incandescent even when exposed merely to the impressed voltage of an open circuit of that class to be presently set forth. Complementary terminals of the socket S are in series with the plug 10 and device C at 16 and 17. It is now obvious that if the circuit closing and opening device is in circuit closing position, current will flow from the plug terminal 10a through device C and thence in series parallel through contacts 12, 17 and 13, 16 of the socket to plug terminal 10b. In other words, the contacts of socket S will place an appliance in series with the plug 10 and circuit closing and opening device C.

It will further be appreciated that with the circuit closing and opening device C in circuit closing position the gas tube 14 will be in series therewith and will be energized into relatively bright incandescence. If, on the other hand, the circuit closing and opening device is in open circuit position, then the gas tube will have applied thereto the voltage of the circuit into which the plug 10 is engaged. Therefore, gas tube 14 under those circumstances will have a slight degree of incandescence. It is, therefore, obvious that by merely glancing at the gas tube 14, it is possible to determine whether or not the circuit closing and opening device is in open or closed position and whether it is plugged into a live circuit.

Referring now more particularly to Figs. 2, 3, and 4, the gas tube 14 is housed in a small casing 20 secured by eyelets 21 and 22 to the body of the socket S, this body being hollow and formed of some suitable nonconducting material. The resistor 23 is shown in Fig. 4 in position within the body of the socket S and wired into the electric circuit as best illustrated in Fig. 5. The actual contact terminals of the socket are designated by reference numbers 24 and 25, each being formed of a suitable conducting material such as sheet brass and with the contact parts projecting upwardly through suitable slots 26 in the socket S for cooperation with the usual prongs of the plug of an appliance.

In order to prevent the outward pulling of the wires from the body of socket S, a metal ring 30 is crimped about the lead-in wires 31 and 32 of my combination, the case itself being slotted as at 33 to receive the wires 31 and 32, the slot 33 being of course, narrower than the diameter of the crimping rings 30.

Those skilled in the art will fully appreciate that by the simple application to a standard type of socket of the gas tube 14, and through the particular novel arrangement of the gas tube in the circuit of the socket, I am able to obtain an effective indication of the condition of the circuit. Thus it is easy to determine whether or not it is in complete open condition, or plugged into a live circuit and energized or de-energized through the closing or opening of the circuit by the circuit closing and opening device C. It is further obvious that the circuit opening and closing device may be a thermostat whereby to control thermostatically the operation of an appliance plugged into socket S. On the other hand, it may be a time controlled mechanism for controlling and timing the energizing of the socket S, and the consequent energizing of the appliances plugged into the socket S.

I now claim:

1. An article of commerce comprising a circuit closing and opening device for alternating current, a socket the terminals of which are in series with said circuit closing and opening device, a plug the terminals of which are in series also with said socket terminals and said circuit closing and opening device, whereby when said plug terminals are plugged into a live circuit and said circuit closing and opening device is in circuit closing position, said socket is alive, a gas tube secured to said socket and having its terminal in series with one terminal of said socket whereby to indicate by its incandescence when said socket terminal is in a live circuit even when said circuit closing and opening device is in open position.

2. An article of commerce comprising a circuit closing and opening device for alternating current, a socket the terminals of which are in series with said circuit closing and opening device, a plug the terminals of which are in series also with said socket terminals and said circuit closing and opening device, whereby when said plug terminals are plugged into a live circuit and said circuit closing and opening device is in circuit closing position, said socket is alive, a gas tube secured to said socket and having its opposed terminals in series with one terminal of said socket whereby to indicate by a low incandescence that said socket terminal is in a live circuit when said circuit closing and opening device is in open circuit position, and by a high incandencence when said socket terminal is in a live circuit and that said circuit closing and opening device is in circuit closing position.

3. An article of commerce comprising a circuit closing and opening device for alternating current, a socket having a body of non-conducting material and a pair of terminals in series with said circuit closing and opening device, a plug the terminals of which are in series also with said socket terminals and said circuit closing and opening device whereby when said plug terminals are plugged into a live circuit and said circuit closing and opening device is in circuit closing position, said socket is alive, a gas tube secured to an outside surface of said socket body and having its terminals extending into said body into series connection with one terminal of said socket whereby to indicate by its incandescence when said socket terminal is in a live circuit.

4. An article of commerce comprising a circuit closing and opening device for alternating current, a socket having a body of non-conducting material and a pair of terminals in series with said circuit closing and opening device, a plug the terminals of which are in series also with said socket terminals and said circuit closing and opening device whereby when said plug terminals are plugged into a live circuit and said circuit closing and opening device is in circuit closing position, said socket is alive, a gas tube secured to an outside surface of said socket body and having its opposed terminals extending through bores in said body into series connection with one terminal of said socket whereby to indicate by a low incandescence that said socket terminal is in a live circuit but that said circuit closing and opening device is in open circuit position, and by a high incandescence that said socket terminals are in a live circuit and that said circuit closing and opening device is in circuit closing position.

5. An article of commerce comprising a socket having a body of non-conducting material and housing a pair of terminals, a plug having a pair of terminals, a circuit closing device for alternating current, a wire running from one terminal of said plug through said circuit closing device to one of said socket terminals, then from the other socket terminal to the other plug terminal, a gas tube secured to said socket and having its circuit in series with one terminal of said socket whereby to indicate by its incandescence when said socket terminal is in a live circuit.

6. An article of commerce comprising a socket having a body of non-conducting material and housing a pair of terminals, a plug having a pair of terminals, a circuit closing device for alternating current, a wire running from one terminal of said plug through said circuit closing device to one of said socket terminals, then from the other socket terminal to the other plug terminal, a gas tube secured to said socket and having its opposed terminals in series with one of the terminals of said socket whereby to indicate by a low incandescence that said socket terminals are in a live circuit but that said circuit closing device is in open circuit position, and by a high incandescence that said socket terminals are in a live circuit and that said circuit closing device is in circuit closing position.

7. An article of commerce comprising a socket body, contacts in said socket body for the plugging in of an appliance or the like, a pair of terminals for said socket body in series with said socket body contacts, a gas tube of the class described secured to said socket body, and means whereby said gas tube is in series electrical contact with one terminal of said socket body, whereby said gas tube indicates by its incandescence that said one terminal of said socket body is in a live alternating current circuit.

8. An article of commerce comprising a socket body, contacts in said socket body for the plugging in of an appliance or the like, a pair of terminals for said socket body in series with said socket body contacts, a gas tube of the class described secured to said socket body, said gas tube being connected in series with one terminal of said socket body whereby to indicate by a low incandescence that said one terminal of said socket body is in a live alternating current circuit, and by a high incandescence that the terminals of said socket body are across a live circuit.

References Cited in the file of this patent
UNITED STATES PATENTS

| Number | Name | Date |
| --- | --- | --- |
| 1,314,218 | Rodrigues | Aug. 26, 1919 |
| 1,935,771 | Feurstein et al. | Nov. 21, 1933 |
| 2,001,671 | Villa | May 14, 1935 |
| 2,112,137 | Brach | Mar. 22, 1938 |
| 2,518,812 | Oswald | Aug. 15, 1950 |
| 2,563,066 | Procopio | Aug. 7, 1951 |